United States Patent
Liu et al.

(10) Patent No.: US 12,130,397 B2
(45) Date of Patent: Oct. 29, 2024

(54) SEISMIC ACQUISITION SYSTEM BASED ON FREQUENCY DOMAIN EXPANSION MEMS SENSOR

(71) Applicant: Institute of Geology and Geophysics, Chinese Academy of Sciences, Beijing (CN)

(72) Inventors: Jing Liu, Beijing (CN); Zongwei Li, Beijing (CN); Yongjian Zhou, Beijing (CN); Kedu Han, Beijing (CN); Changchun Yang, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 17/992,952

(22) Filed: Nov. 23, 2022

(65) Prior Publication Data

US 2024/0077632 A1 Mar. 7, 2024

(30) Foreign Application Priority Data

Sep. 1, 2022 (CN) .......................... 202211059693.2

(51) Int. Cl.
*G01V 1/46* (2006.01)
*G01V 1/18* (2006.01)

(52) U.S. Cl.
CPC .................. *G01V 1/46* (2013.01); *G01V 1/18* (2013.01); *G01V 2210/1429* (2013.01)

(58) Field of Classification Search
CPC ..... G01V 1/46; G01V 1/18; G01V 2210/1429
See application file for complete search history.

(56) References Cited

U.S. PATENT DOCUMENTS 7,639,071 B2 * 12/2009 Chang ................ H03H 11/1291
327/557
8,305,845 B2 * 11/2012 Kamata .................. G01V 1/181
367/25
(Continued)

FOREIGN PATENT DOCUMENTS

CN 104914460 A 9/2015
CN 104914461 A 9/2015
(Continued)

OTHER PUBLICATIONS

CN-110763870-A (machine translation) (Year: 2020).*
(Continued)

*Primary Examiner* — Yuqing Xiao
*Assistant Examiner* — Christopher Richard Walker
(74) *Attorney, Agent, or Firm* — Nitin Kaushik

(57) ABSTRACT

The present disclosure belongs to the field of geological exploration, and particularly relates to a seismic acquisition system based on a frequency domain expansion MEMS sensor, aiming at solving the problem that vibration frequencies exceed the frequency range of the MEMS sensor due to strong vibrations and cross coupling of multi-frequency signals usually occurring in well logging while drilling. When the MEMS sensor suffers strong vibrations or the MEMS sensor that can be selected cannot ensure that the frequency requirement of a measurement signal is stably met, the frequency domain expander of the present disclosure expands the frequency domain of a detection signal, so that the MEMS sensor can measure strong vibrations and out-of-band frequencies to a certain extent, the application range of the seismic acquisition system is extended, and the anti-mutation capability of the seismic acquisition system is improved.

15 Claims, 13 Drawing Sheets

1. MEMS Sensor
2. ADC Analog-digital converter (ADC)
3. Readout circuit
4. Digital signal control unit
5. Frequency domain expander
6. Output
7. Feedback circuit

(56) References Cited

U.S. PATENT DOCUMENTS

| | | | |
|---|---|---|---|
| 9,722,548 B2 * | 8/2017 | Oshita | H03F 3/72 |
| 2005/0201206 A1 * | 9/2005 | Luc | G01V 1/181 |
| | | | 367/182 |
| 2010/0116054 A1 * | 5/2010 | Paulson | G01P 15/131 |
| | | | 73/514.32 |
| 2012/0212288 A1 * | 8/2012 | Masui | H03H 11/0427 |
| | | | 327/557 |
| 2015/0177272 A1 * | 6/2015 | Clark | G01P 15/097 |
| | | | 73/514.32 |

FOREIGN PATENT DOCUMENTS

| | | | | |
|---|---|---|---|---|
| CN | 108181648 A | | 6/2018 | |
| CN | 110763870 A | * | 2/2020 | B81B 7/008 |
| CN | 112325919 A | * | 2/2021 | G01D 18/00 |

OTHER PUBLICATIONS

CN-112325919-A (Machine Translation) (Year: 2021).*
Izadian ("Fundamentals of Modern Electric Circuit Analysis and Filter Synthesis". Springer International Publishing, 2019, pp. 433-448.) (Year: 2019).*
Vitale et al. ("Bandwidth extension of a 4.5 Hz geophone for seismic monitoring purpose," 2018 IEEE International Conference on Environmental Engineering (EE), Milan, Italy, 2018) (Year: 2018).*

* cited by examiner

1. MEMS Sensor
2. ADC Analog-digital converter (ADC)
3. Readout circuit
4. Digital signal control unit
5. Frequency domain expander
6. Output
7. Feedback circuit

SEISMIC ACQUISITION SYSTEM BASED ON FREQUENCY DOMAIN EXPANSION MEMS SENSOR

CROSS-REFERENCE TO RELATED APPLICATIONS

The application claims priority to Chinese patent application No. 2022110596932, filed on Sep. 1, 2022, the entire contents of which are incorporated herein by reference.

TECHNICAL FIELD

The present disclosure belongs to the field of geological exploration, in particular to a seismic acquisition system based on a frequency domain expansion MEMS sensor.

BACKGROUND

In geological exploration, it is usually necessary to continuously acquire seismic signals for a long time, and MEMS sensors are commonly used for seismic signal acquisition. In well logging while drilling, strong vibrations and cross coupling of multi-frequency signals often occur. To achieve accurate measurement, MEMS sensors are needed to overcome the problem that system performances become poor in situations such as saturation caused by strong vibrations. Traditional MEMS sensors have a bandwidth of 300 Hz, but scenes requiring 1000 Hz detection often occur in seismic acquisition, and therefore, in order to improve the accuracy and adaptability of the MEMS sensors, it is necessary to develop a seismic acquisition system based on a frequency domain expansion MEMS sensor.

SUMMARY

In order to solve the above problems in the prior art, that is, vibration frequencies exceed the frequency range of an MEMS sensor due to strong vibrations and cross-coupling of multi-frequency signals easily occuring in well logging while drilling, the present disclosure provides a seismic acquisition system based on a frequency domain expansion MEMS sensor. The acquisition system comprises an MEMS sensor, a readout circuit, a frequency domain expander, an analog-to-digital converter (ADC), a digital signal control unit, and a feedback circuit;

the MEMS sensor is used for receiving a seismic wave signal and well logging information and outputting an MEMS displacement signal;

the readout circuit is used for reading the MEMS displacement signal and outputting the MEMS displacement signal in the form of an electrical signal;

the analog-to-digital converter is used for converting the electrical signal into a digital readout signal and transmitting the digital readout signal to the digital signal control unit;

the digital signal control unit is used for generating a control signal to control the working mode of the frequency domain expander according to the digital readout signal;

the frequency domain expander is used for performing waveform compensation on the electrical signal according to the control signal, and outputting a non-frequency expansion signal or a frequency expansion signal; and the feedback circuit is used for generating a feedback signal to the MEMS sensor according to the non-frequency expansion signal or the frequency expansion signal to form a closed loop.

In a preferred embodiment, the circuit structure of the frequency domain expander is as follows: an input end is connected to an inverting input end of an operational amplifier OP by a first capacitor C1 and a first resistor R1 connected in series;

a second resistor R2 is connected to the inverting input end of the operational amplifier OP and an output end;

a non-inverting input end of the operational amplifier is grounded;

a first switch S1 is connected in parallel to both ends of the first capacitor C1;

a second capacitor C2 is connected in series to a second switch S2, and the second capacitor C2 and the second switch S2 are connected in parallel to both ends of the second resistor R2; and one end of a third switch S3 is connected to the input end, and the other end is connected to the output end.3.

Through the above-mentioned circuit structure, the basic function of frequency domain expansion can be realized, and by setting the on-off of the switches, the function and function switching of signal extraction and signal attenuation in a specific frequency band can be realized.

In a preferred embodiment, the digital signal control unit is used for sending out a control signal carrying a frequency expansion control instruction when detecting that the seismic wave signal and the well logging information exceed a frequency band of the MEMS sensor. Whether the frequency domain expander is enabled or not is controlled by whether the control signal carrying the frequency expansion control instruction is sent out or not, so that the output of signals is not affected within a resonance frequency, and once the resonance frequency is exceeded, the compensation is immediately performed to smooth the frequency response and avoid introducing noise into signal acquisition within the resonance frequency.

In a preferred embodiment, the frequency expansion control instruction makes the switches S1 and S3 be switched off and the switch S2 be switched on; and when the non-frequency expansion signal needs to be output, the switch S3 is controlled to be switched on.

In a preferred embodiment, when the frequency domain expander receives the control signal carrying the frequency expansion control instruction, a transfer function of the frequency domain expander is as follows:

$$H\_1(s) = -(R\_2 \times C\_1 \times s)/(R\_1 \times C\_1 \times s + 1)$$

Where $R_1$ represents the resistance value of the first resistor R1, $R_2$ represents the resistance value of the second resistor R2, $C_1$ represents the capacitance value of the first capacitor C1, $H_1(s)$ is the complex frequency domain form of the transfer function of the frequency domain expander, and s represents the complex frequency.

The transfer function shows a relatively small amplitude response in a low frequency stage, but the transfer function can show a rapid upward trend on the boundary of the frequency band of the MEMS sensor by adjusting the capacitance value and the resistance value, that is, waveforms are compensated at a position where the frequency response of the MEMS sensor attenuates rapidly; so that the superimposed waveforms only show a small fluctuation and retains a basic frequency-amplitude response instead of being completely undetectable.

In a preferred embodiment, the transfer function of tine frequency band extractor is as follows:

$$H\_2(s) = -(C\_1 \times R\_2 \times s)/(R\_1 \times s + 1)(R\_2 \times s + 1)$$

where $R_1$ represents the resistance value of the first resistor R1, $R_2$ represents the resistance value of the second resistor R2, $C_1$ represents the capacitance value of the first capacitor C1, $C_2$ represents the capacitance value of the second capacitor C2, and $H_2(s)$ represents the complex frequency domain form of the transfer function of the frequency band extractor, and s represents the complex frequency.

The frequency transfer function of the frequency hand extractor can quickly attenuate signals out of setting band by controlling the capacitance value and the resistance value, and after superposition, a magnitude frequency response of signals in a specific frequency band can be enhanced, signals outside the specific frequency band are no longer monitored, and thus, the frequency band extraction is realized.

In a preferred embodiment, the MEMS sensor is further used for acquire displacement changes signal caused by external acceleration and speed, outputting an MEMS displacement signal, and performing vibration measurement tasks, displacement measurement tasks or aero-engine monitoring tasks.

The present disclosure has the beneficial effects that:

(1) the frequency domain expander of the present disclosure compensates the frequency domain of a detection signal when the MEMS sensor suffers strong vibrations or the MEMS sensor that can be selected cannot stably meet the frequency requirements of signals under test, so that the MEMS sensor can perform measurements under strong vibrations and higher frequencies to a certain extent, the influence caused by the attenuation of the detection signal is reduced when the resonance frequency of the MEMS sensor is exceeded, the application range of the seismic acquisition system is extended, and the anti-mutation capability of the seismic acquisition system is improved.

(2) By controlling the switches to adjust the connection mode of the resistors and capacitors, the frequency domain expander of the present disclosure can extract signals in the specific frequency range, suppress or attenuate signals outside the specific frequency range, and further realize the function of extracting signals in the specific frequency range.

DETAILED DESCRIPTION OF THE EMBODIMENTS

The present disclosure provides a seismic acquisition system based on a frequency domain expansion MEMS sensor.

the frequency domain expander of the present disclosure compensates the frequency domain of a detection signal when the MEMS sensor suffers strong vibrations, so that the MEMS sensor can perform measurements under strong vibrations and higher frequencies to a certain extent, the influence caused by the attenuation of the detection signal is reduced when the resonance frequency of the MEMS sensor is exceeded, the application range of the seismic acquisition system is extended, and the anti-mutation capability of the seismic acquisition system is improved.

The seismic acquisition system based on the frequency domain expansion MEMS sensor comprises an MEMS sensor, a readout circuit, a frequency expander, an analog-to-digital converter (ADC), a digital signal control unit, and a feedback circuit, the MEMS sensor is used for receiving a seismic wave signal and well logging information and outputting an MEMS displacement signal;

the readout circuit is used for reading the MEMS displacement signal and outputting the MEMS displacement signal in the form of an electrical signal;

the analog-to-digital converter is used for converting the electrical signal into a digital readout signal and transmitting the digital readout signal to the digital signal control unit;

the digital signal control unit is used for generating a control signal to control the working mode of the frequency domain expander according to the digital readout signal;

the frequency domain expander is used for performing waveform compensation on the electrical signal according to the control signal, and outputting a non-frequency expansion signal or a frequency expansion signal; and the feedback circuit is used to generate a feedback signal to the MEMS sensor according to the non-frequency expansion signal or the frequency expansion signal to form a closed loop.

Figure 1:
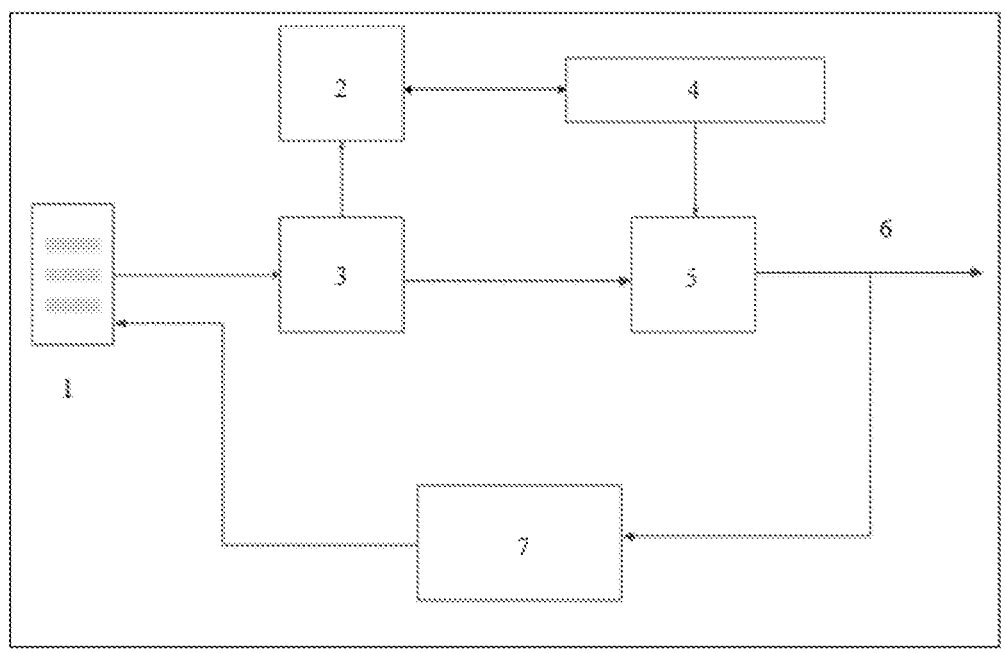
FIG. 1 is the principle structure diagram of a seismic acquisition system based on a frequency domain expansion MEMS sensor according to the present disclosure.

In order to explain the seismic acquisition system based on the frequency expansion MEMS sensor more clearly, various function modules in the embodiment of the present disclosure will be described in detail below with reference to FIG. 1.

Figure 3:
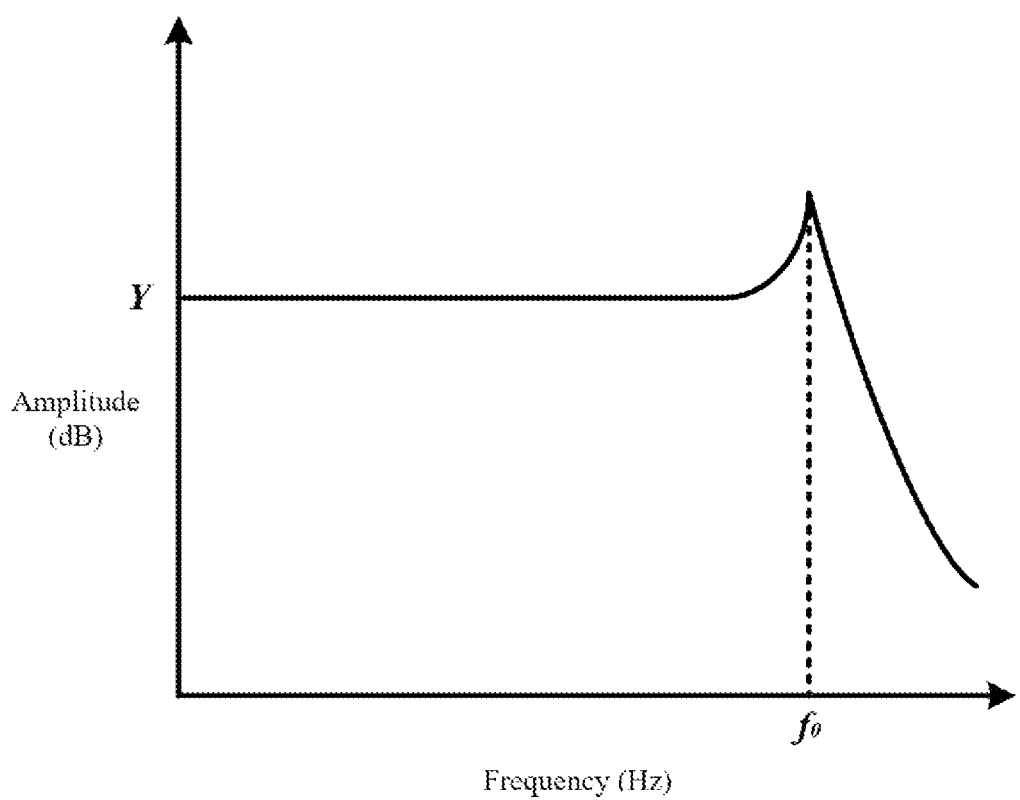
FIG. 3 is a schematic diagram of the frequency response of a conventional MEMS sensor-based detection system.

The seismic acquisition system based on the frequency expansion MEMS sensor according to a first embodiment of the present disclosure comprises the MEMS sensor, the readout circuit, the frequency expander, the analog-to-digital converter (ADC), the digital signal control unit and the feedback circuit. The various function modules are described in detail as follows:

the MEMS sensor is used for receiving a seismic wave signal and well logging information and outputting the MEMS displacement signal; the MEMS sensor comprises a fixed electrode, a movable mass, and a shell; and by detecting external physical signals such as vibration and sound, and converting the external physical signals into displacement signals of the mass of the MEMS sensor, the capacitance of the MEMS sensor is changed, and the transfer function of the MEMS sensor is as follows:

$$M(s) = \frac{X}{a_{in}} = \frac{1}{s^2 + \frac{b}{m}s + \frac{k}{m}}$$

m represents the size of the movable mass block, b represents a damping coefficient, k represents a spring coefficient of an elastic beam, and X represents the displacement change caused by external acceleration and speed; and the bandwidth of the MEMS sensor in the prior art is limited, and if the detection frequency continuously increases above 300 Hz, the amplitude of a detection signal will decrease rapidly with the increase of frequencies; as shown in FIG. 3, the signal with a frequency higher than the resonance frequency f0 of the MEMS sensor will not be output by the system, or attenuates to a very small value that cannot be detected; in FIG. 3, Y is the amplitude of MEMS gain when the frequency is 0 Hz; and FIG. 3 is the case where the quality factor Q value of the MEMS sensor is greater than 0, and there is no resonance peak when the Q value is less than or equal to 0.

The readout circuit is used for reading the MEMS displacement signal and outputting the MEMS displacement signal in the form of an electrical signal. The readout circuit may comprise an operational amplifier, a switch, a feedback capacitor, and a compensation capacitor, or may comprise an operational amplifier, a resistor, and a feedback capacitor. The specific structure of the readout circuit may be adjusted according to the task of converting the capacitance change signal of the MEMS sensor into a voltage signal or a current signal.

The analog-to-digital converter is used for converting the electrical signal into a digital readout signal and transmitting the digital readout signal to the digital signal control unit; the number of hits of the analog-to-digital converter depends on the amplitude of an analog signal output by readout circuit, such as 10-bit, 12-bit or 14-bit; and the sampling rate of the analog-to-digital converter depends on the frequency of the analog signal output by the readout circuit, such as 1 MHz, 10 MHz or 20 MHz.

The digital signal control unit is used for generating a control signal to control the working mode of the frequency domain expander according to the digital readout signal.

In the present embodiment, the digital signal control unit is used for sending out a control signal carrying a frequency expansion control instruction when detecting that the seismic wave signal and the well logging information exceed a frequency band of the MEMS sensor.

In the present embodiment, the digital signal control unit is further used for controlling the working tine sequence, sampling or not, sampling rate, and reference voltage of the analogy-to-digital converter.

The frequency domain expander is used for performing waveform compensation on the electrical signal according to the control signal and outputting a non-frequency expansion signal or a frequency expansion signal.

Figure 2:
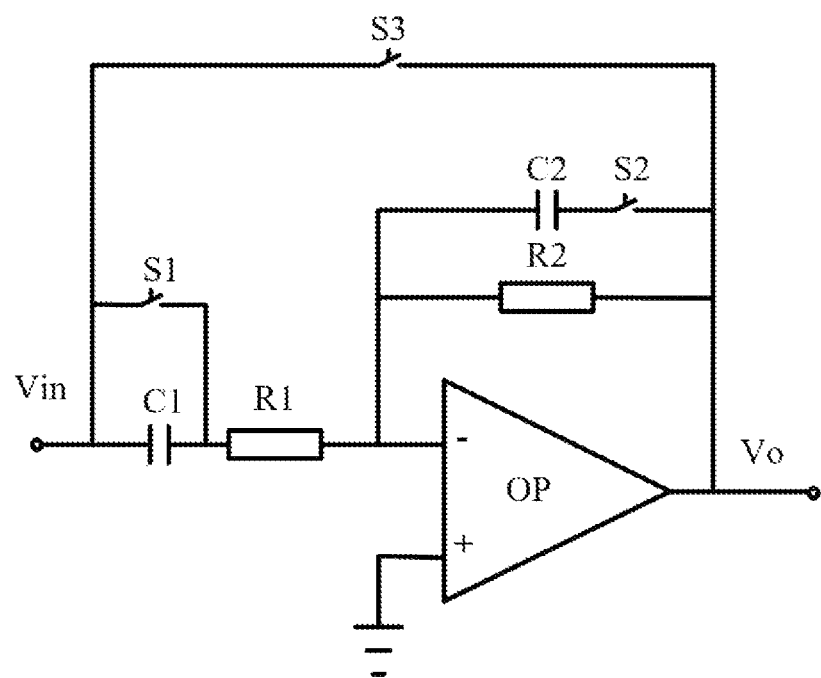
FIG. 2 is a schematic circuit diagram of a frequency domain expander according to an embodiment of the present disclosure.

In the present embodiment, the circuit structure of the frequency domain expander is shown in FIG. 2 as follows:

an input end is connected to an inverting input end of an operational amplifier OP by a first capacitor C1 and a first resistor R1 connected in series;

a second resistor R2 is connected to the inverting input end of the operational amplifier OP and an output end;

a non-inverting input end of the operational amplifier is grounded;

a first switch S1 is connected in parallel to both ends of the first capacitor C1;

a second capacitor C2 is connected in series to a second switch S2, and the second capacitor C2 and the second switch S2 are connected in parallel to both ends of the second resistor R2; and one end of the third switch S3 is connected to the input end, and the other end is connected to the output end.

The feedback circuit is used for generating a feedback signal to the MEMS sensor according to the non-frequency expansion signal or the frequency expansion signal to form a closed loop.

In the present embodiment, the frequency domain expander is used for extracting or attenuating signals in a set frequency or a set frequency band, so as to avoid system saturation and/or oscillation of the seismic acquisition system in the application scenes of strong vibrations or multi-frequency signals and improve system stability.

In the present embodiment, the MEMS sensor is further used for collecting displacement changes caused by external acceleration and speed, and performing vibration measurement tasks, displacement measurement tasks, and aero-engine monitoring tasks.

According to a second embodiment of the present disclosure, signals with frequencies exceeding the resonance frequency of the MEMS sensor are collected by the seismic acquisition system based on the frequency domain expansion MEMS sensor.

Specifically, the digital signal control unit is used tor sending out the control signal carrying the frequency expansion control instruction when detecting that the seismic wave signal and the well logging information exceed the frequency band of the MEMS sensor.

Figure 9:
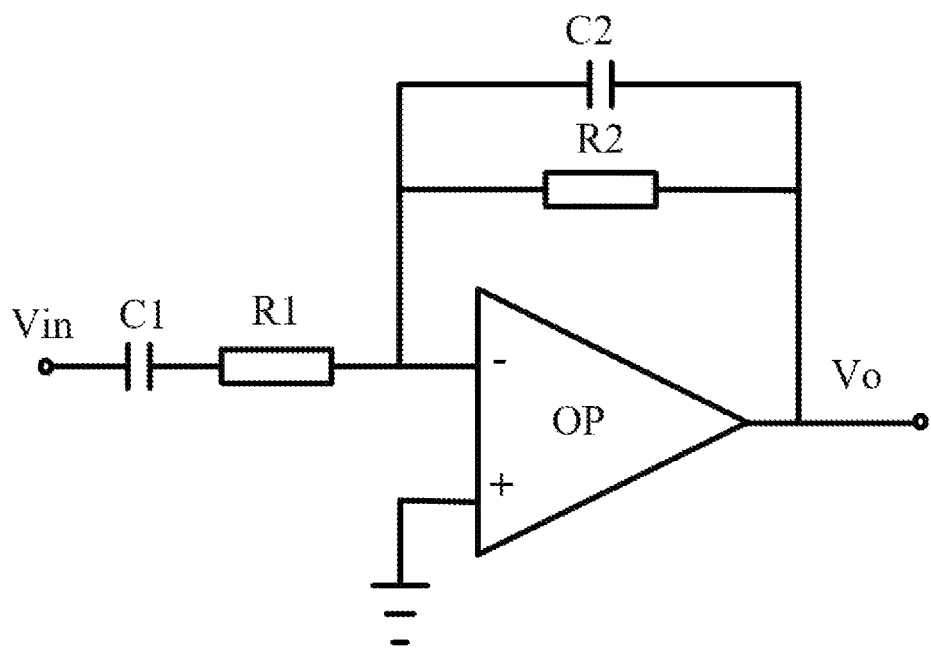
FIG. 9 is an equivalent circuit diagram of a frequency domain expander as a frequency band extractor in a third embodiment.

In the present embodiment, the frequency expansion control instruction makes the switches S1 and S3 be switched off and the switch S2 be switched on, as shown in FIG. 9; and when the non-frequency expansion signal needs to be output, the switch S3 is controlled to be switched on.

In the present embodiment, when the frequency domain expander receives the control signal carrying the frequency expansion control instruction, a transfer function of the frequency domain expander is as follows:

$$H_2(s) = -\frac{C_1 \times R_2 \times s}{(R_1 \times C_1 \times s + 1)(R_2 \times C_2 \times s + 1)}$$

Where $R_1$ represents the resistance value of the first resistor R1, $R_2$ represents the resistance value of the second resistor R2, $C_1$ represents the capacitance value of the first capacitor C1, $C_2$ represents the capacitance value of the second capacitor C2, and $H_2(s)$ is the complex frequency domain form of the transfer function of the frequency domain expander, and s represents the complex frequency, and s represents the complex frequency.

Figure 10:
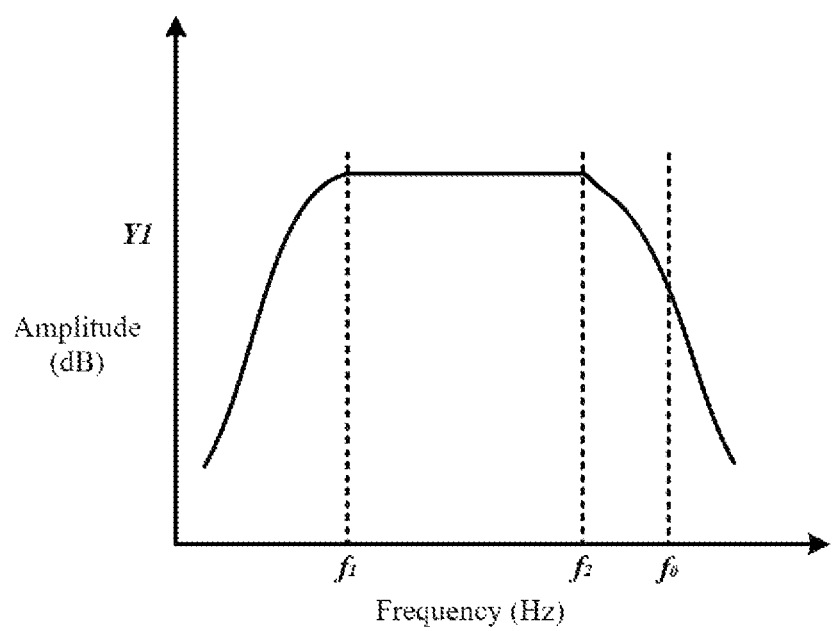
FIG. 10 is a schematic diagram of the frequency response of a frequency domain expander as a frequency band extractor in a third embodiment.

When the control signal carrying the frequency expansion control instruction is received, an equivalent circuit of the frequency domain expander is shown in FIG. 9; and when the frequency expansion control instruction is received, the frequency response of the frequency domain expander is shown in FIG. 10.

Figure 6:
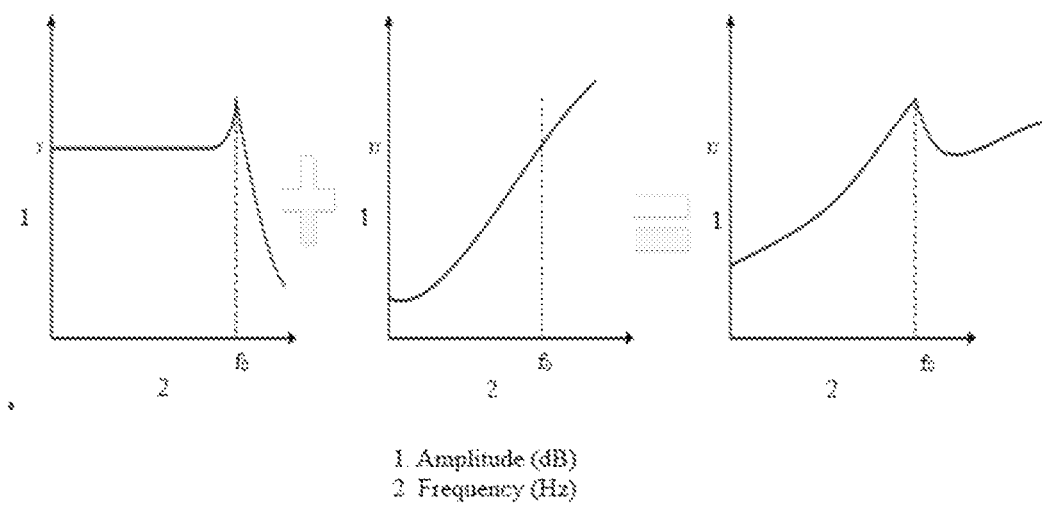
FIG. 6 is a system frequency response diagram when signals with frequencies exceeding the resonance frequency of the MEMS sensor are collected in a second embodiment.
Figure 7:
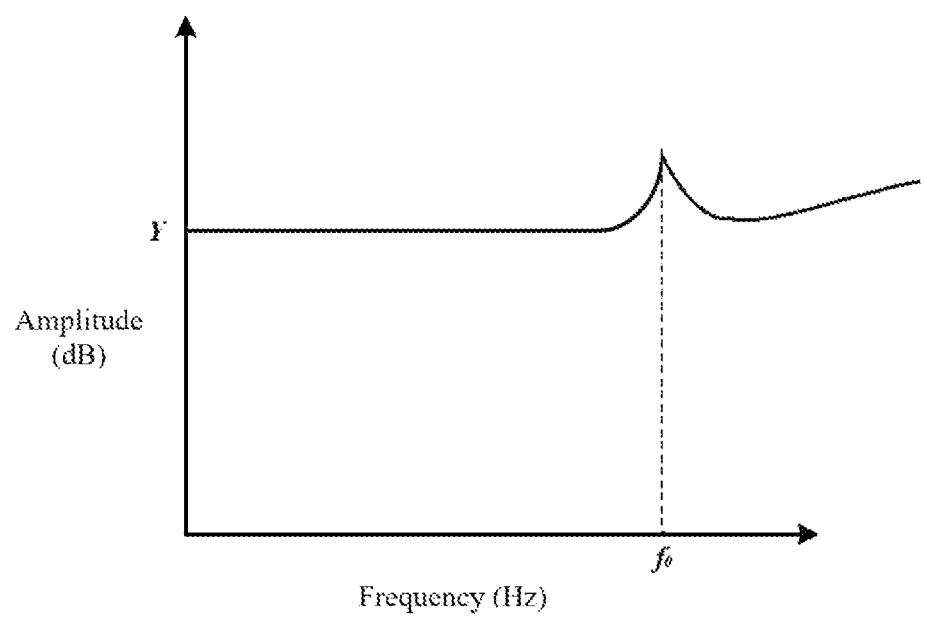
FIG. 7 is a frequency response diagram of the whole frequency stage of the present disclosure after frequency domain compensation in a second embodiment.
Figure 8:
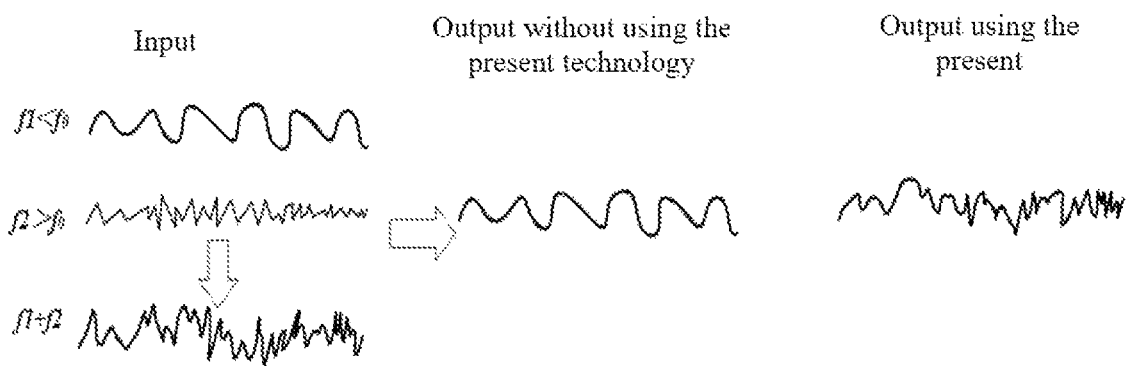
FIG. 8 is a schematic diagram of the input-output relationship when signals with frequencies exceeding the resonance frequency of the MEMS sensor are collected in a second embodiment.

FIG. 6 shows the influence of the frequency domain expander on the relationship between the magnitude and frequency of the MEMS sensor when the frequency expansion control instruction is received according to the present embodiment, and it can be seen that through the frequency domain compensation of the present disclosure, a certain degree of frequency response can still be retained in a section where the frequency of the detection signal is higher than the resonance frequency f0 of the MEMS sensor to realize the effect of frequency expansion detection. By combining the analog-to-digital converter (ADC) and the digital signal control unit, the frequency domain expander is controlled to start automatically when detecting that the frequency of the electrical signal exceeds the resonance frequency f0 of the MEMS sensor, so that the original amplitude response can be retained within the resonance frequency f0, there is also a stable amplitude response in the frequency hand exceeding the resonance frequency f0, and thus, electrical signals with frequencies beyond f0 are measured to a certain extent, which is as shown in FIG. 7. After adjustment in the present embodiment, the relationship between an input voltage and an output voltage is as shown in FIG. 8. In FIG. 8, a signal to be measured comprises both a low-frequency signal f1 with a frequency below the resonance frequency and a high-frequency signal f2 with a frequency exceeding the resonance frequency at the same time, signals that should he measured in an ideal state are f1+f2, is however, due to the limitation of the resonance frequency of the traditional MEMS detection system, the output signal is shown in the waveform of FIG. 8 which is not output by the present technology, and the waveform output by the present technology can obtain the approximate waveform of f1+f2 relatively clearly, and ensure that the relevant information will not be lost. Furthermore, by optimizing the gain and bandwidth of the frequency domain expander, the actually measured waveform is infinitely close to the ideal state. For example, the magnitude-frequency response of the transfer function of the MEMS sensor system is smoother at a resonance frequency point by designing a zero of the frequency domain expander that matches the resonance frequency point of the MEMS sensor, or the transfer function of the frequency domain expander is optimally designed by analyzing the inverse function of the transfer function of the MEMS sensor, so that the system transfer function is smoothed in the whole frequency domain, and the output waveform is inure ideal. According to the present disclosure, the application range of the MEMS sensor is extended, and the application scenes of wide frequency bands are increased.

The resistance value $R_1$ of the first resistor R1, the resistance value $R_2$ of the second resistor R2, and the capacitance value $C_1$ of the first capacitor C1 are set according to the resonance frequency of the MEMS sensor, which is specifically as follows:

it is determined according to the usage scene and the measurement range of the MEMS sensor, for example, if the frequency range of the MEMS sensor is 0-500 Hz, it is necessary to expand the frequency domain with f3=500 Hz or more; and ideally, sensor parameters and circuit requirements are considered, it is preferred to select the appropriate resistance value of the resistor R1 as 1 kΩ, and thus, the capacitance value is calculated by the transfer function according to the value of f3 and the resistance value of 1 kΩ.

Figure 4:
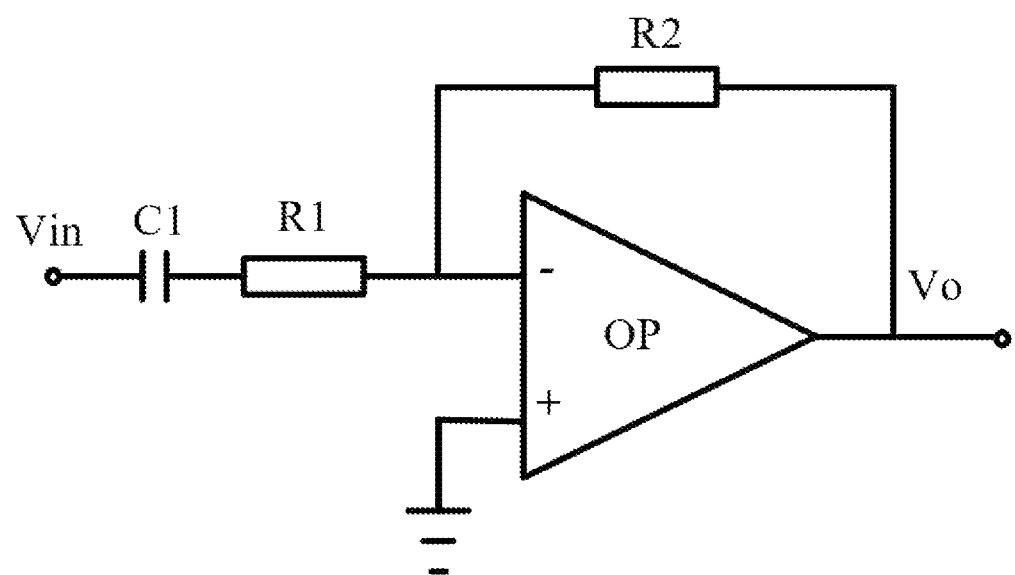
FIG. 4 is an equivalent circuit diagram when signals with frequencies exceeding the resonance frequency of the MEMS sensor are collected in a second embodiment.

According to a third embodiment of the present disclosure, a system for extracting signals of a preset frequency band by using the frequency domain expander as a frequency band extractor is provided, and the system structure is the same as that of the seismic acquisition system based on the frequency domain expansion MEMS sensor; and the control signal carrying the frequency band extraction instruction is sent out by the digital signal control unit to make the switches S1, S2 and S3 of the frequency domain expander be all switched off, so that the frequency domain expander is used as the frequency band extractor. The equivalent circuit of the frequency band extractor in the present embodiment is shown in FIG. 4.

In the present embodiment, the transfer function of the frequency band extractor is as follows:

$$H_1(s) = -\frac{R_2 \times C_1 \times s}{R_1 \times C_1 \times s + 1}$$

Where $R_1$ represents the resistance value of the first resistor R1, $R_2$ represents the resistance value of the second resistor R2, $C_1$ represents the capacitance value of the first capacitor C1, $H_1(s)$ represents the complex frequency domain form of the transfer function of the frequency band extractor, and s represents the complex frequency.

In the present embodiment, it is determined according to the usage scene and the measurement range of the MEMS sensor. The frequency band extractor of the present embodiment is equivalent to a band-pass filter; and when it is clear that the electrical signal between f1 and f2 needs to be extracted, the resistance value and the capacitance value can he determined by two poles of a second-order system denominator of the transfer function of the frequency band extractor.

Figure 5:
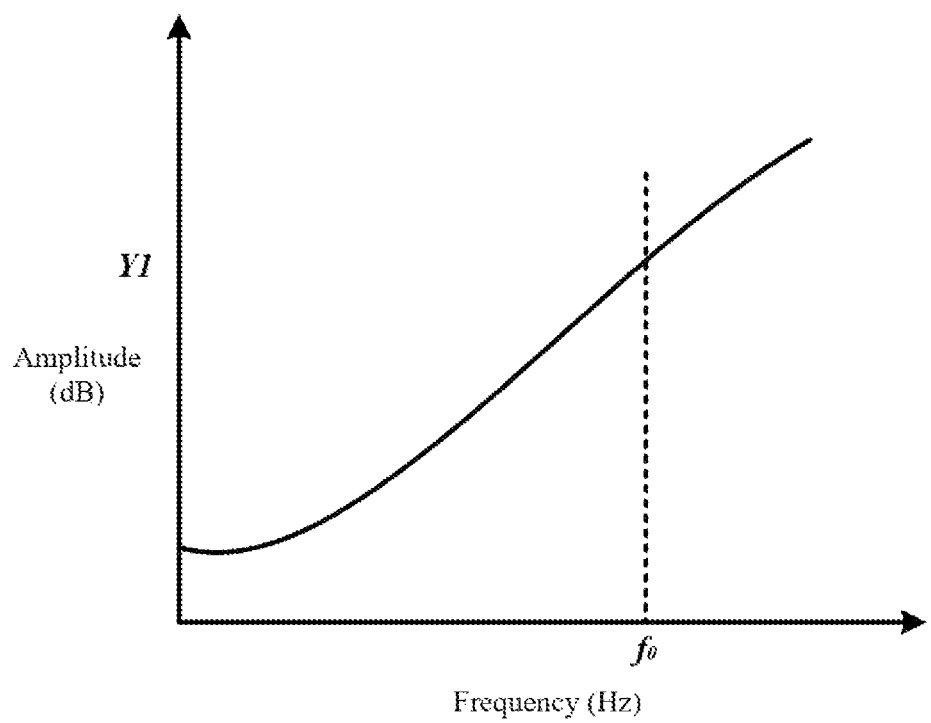
FIG. 5 is a frequency response diagram of a frequency domain expander when signals with frequencies exceeding the resonance frequency of the MEMS sensor are collected in a second embodiment.
Figure 11:
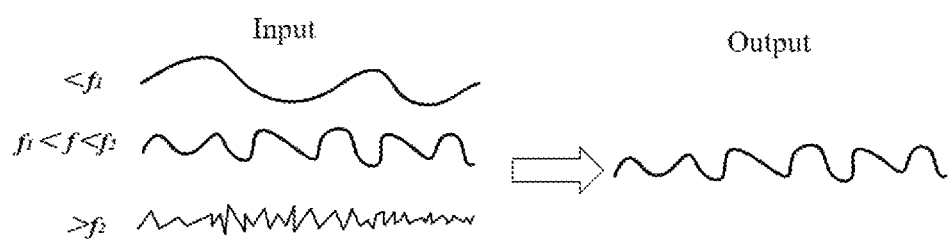
FIG. 11 is a schematic diagram of the input-output relationship of a frequency domain expander as a frequency band extractor in a third embodiment.

In the present embodiment, the schematic diagram of the frequency response is shown in FIG. 5, the frequency domain expander automatically attenuates signals with frequencies less than f1 and signals with frequencies greater than f2, only signals with frequencies between f1 and f2 are retained, and input and output effects thereof are shown in FIG. 11.

The fourth embodiment of the present disclosure provides a detection system that uses the frequency domain expander for filtering signals in a set frequency band to avoid overload or instability of the system caused by the signals. The circuit diagram of the detection system is the same as that of the third embodiment, and is shown in FIG. 9, and the difference is that f1 and f2 in the third embodiment are replaced.

Figure 12:
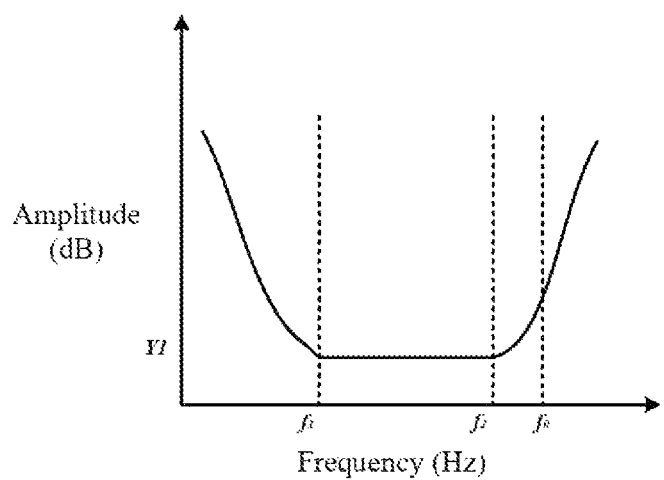
FIG. 12 is a schematic diagram of the frequency response of a frequency domain expander used to filter signals of a set frequency band in a fourth embodiment.
Figure 13:
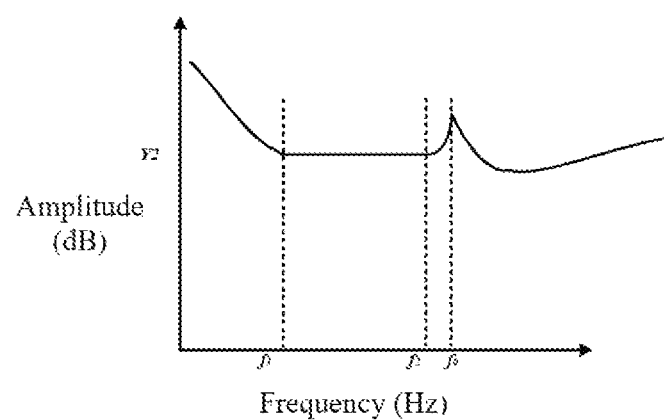
FIG. 13 is a schematic diagram of the frequency response of a system in which a frequency domain expander is used to filter the frequency domain of a set frequency band signal in a fourth embodiment.

The frequency response of the frequency domain expander is shown in FIG. 12. The frequency domain expander can amplify signals whose frequency is less than f1 and signals whose frequency is greater than f2, and control signals in frequency bands of f1-f2 at the same lime to prevent the signals in the present frequency bands from overloading or exceeding the output range of the system to result in system instability. The frequency response of the system is shown in FIG. 13 after signals pass through the frequency adaptive device.

According to a fifth embodiment of the present disclosure, the switch S1 of the frequency domain expander is controlled to be switched on, and the switches S2 and S3 are controlled to be switched off, so that the low-frequency signal detection capability of the acquisition system is enhanced.

According to a sixth embodiment of the present disclosure, switches S1, S2, and S3 of the frequency domain expander are controlled to be switched on, and the frequency domain expansion function of the frequency domain expander is turned off.

According to a seventh embodiment of the present disclosure, an output digital signal is adjusted by the combination of the frequency domain expanders of the above embodiments, and a multiplexer is controlled to gate the corresponding frequency domain expander, so that the frequency expansion effect is realized, that is, the above-mentioned frequency domain expanders and the frequency band extractor are combined and connected by the multiplexer, so that the power consumption and the introduction of switching noise are reduced.

Although the steps are described in the above-mentioned sequence in the above-mentioned embodiment, a person skilled in the art can understand that in order to achieve the effect of the present embodiment, different steps do not need to be performed in such an order, but can be performed simultaneously (in parallel) or in reverse order, and these simple changes are within the scope of protection of the present disclosure.

A person skilled in the art can clearly understand that for convenience and conciseness of description, specific working processes and related explanations of the foregoing described system can refer to the corresponding processes in the foregoing method embodiments, and will not be repeated here.

It should be noted that the seismic acquisition system based on the frequency domain expansion MEMS sensor provided by the above embodiment is only exemplified by the division of the above-mentioned functional modules, in practical application, above functions may be allocated to different functional modules according to needs, that is, the modules or steps in the embodiment of the present disclosure can be decomposed or combined again; and for example, the modules in the above embodiments can be combined into one module or further split into multiple sub-modules to complete all or part of the above-mentioned functions. The names of the modules and steps involved in the embodiments of the present disclosure are only for distinguishing each module or step, and are not regarded as improper restrictions on the present disclosure.

A person skilled in the art should be able to realize that the modules and method steps of each example described in connection with the embodiments disclosed herein can be implemented by electronic hardware, computer software, or the combination of both, and the programs corresponding to the software modules and method steps can be installed in a random access memory (RAM), a memory, a read only memory (ROM), an electrically programmable ROM, an electrically erasable programmable ROM, a register, a hard disk, a removable disk, a CD-ROM, or a well known storage medium in any other forms in the technical field. In order to clearly illustrate the interchangeability of electronic hardware and software, the components and steps of each, example have been generally described in terms of functions in the above description. Whether the functions are executed in a mode of electronic hardware or software depends on particular applications and design constraint conditions of the technical solutions. A person skilled in the art can use different methods for implementing the described functions for each particular application, but such implementation should not be considered to be beyond the scope of the disclosure.

What is claimed is:

1. A seismic acquisition system based on a frequency domain expansion Micro-Electro-Mechanical System (MEMS) sensor, comprising an MEMS sensor, a readout circuit, a frequency domain expander, an analog-to-digital converter (ADC), a digital signal control unit and a feedback circuit, wherein the MEMS sensor is used for receiving a seismic wave signal and well logging information and outputting first MEMS displacement signal;

the readout circuit is used for reading the first MEMS displacement signal and outputting the first MEMS displacement signal in the form of an electrical signal;

the analog-to-digital converter is used for converting the electrical signal into a digital readout signal and transmitting the digital readout signal to the digital signal control unit;

the digital signal control unit is used for generating a control signal to control a working mode of the frequency domain expander according to the digital readout signal, and is specifically used for sending out a control signal carrying a frequency expansion control instruction when detecting that the seismic wave signal and the well logging information are greater a frequency band of the MEMS sensor;

the frequency domain expander is used for performing waveform compensation on the electrical signal according to the control signal, and outputting a non-frequency expansion signal or a frequency expansion signal; and the feedback circuit is used for generating a feedback signal to the MEMS sensor according to the non-frequency expansion signal or the frequency expansion signal to form a closed loop, wherein the circuit structure of the frequency domain expander is as follows:

an input end of the frequency domain expander is connected to a first end of a first capacitor, a second end of the first capacitor is connected to a first end of a first resistor, and a second end of the first resistor is connected to an inverting input end of an operational amplifier;

a second resistor is connected to the inverting input end of the operational amplifier and an output end;

a non-inverting input end of the operational amplifier is grounded;

a first switch is connected in parallel to both ends of the first capacitor;

a second capacitor is connected in series to a second switch, and the second capacitor and the second switch are connected in parallel to both ends of the second resistor; and one end of a third switch is connected to the input end, and the other end is connected to the output end, the frequency expansion control instruction makes the first and third switches be switched off and the second switch be switched on; and when the non-frequency expansion signal needs to be output, the third switch is controlled to be switched on, and when the frequency domain expander receives the control signal carrying the frequency expansion control instruction, a transfer function of the frequency domain expander is as follows:

$$H_2(s) = -\frac{C_1 \times R_2 \times s}{(R_1 \times C_1 \times s + 1)(R_2 \times C_2 \times s + 1)}$$

where $R_1$ represents a resistance value of the first resistor, $R_2$ represents a resistance value of the second resistor, $C_1$ represents a capacitance value of the first capacitor, $C_2$ represents a capacitance value of the second capacitor, and $H_2$ (s) is a complex frequency domain form of the transfer function of the frequency domain expander, and s represents the complex frequency.

2. The seismic acquisition system based on a frequency domain expansion MEMS sensor according to claim 1, wherein the resistance value $R_1$ of the first resistor, the resistance value $R_2$ of the second resistor, and the capacitance value $C_1$ of the first capacitor are set according to a resonance frequency of the MEMS sensor.

3. The seismic acquisition system based on a frequency domain expansion MEMS sensor according to claim 1, wherein the digital signal control unit is further used for controlling a working time sequence, sampling or not, a sampling rate, and a reference voltage of the analog-to-digital converter.

4. The seismic acquisition system based on a frequency domain expansion MEMS sensor according to claim 1, wherein the frequency domain expander can also be used as a frequency band extractor to extract a signal of a preset frequency band, which is specifically as follows:

the digital signal control unit sends out a control signal carrying a frequency band extraction instruction to make the first, second, and third switches of the frequency domain expander be all switched off, so that the frequency domain expander is used as the frequency band extractor.

5. The seismic acquisition system based on a frequency domain expansion MEMS sensor according to claim 4, wherein the transfer function of the frequency band extractor is as follows:

$$H_1(s) = -\frac{R_2 \times C_1 \times s}{R_1 \times C_1 \times s + 1}$$

where $R_1$ represents the resistance value of the first resistor, $R_2$ represents the resistance value of the second resistor, $C_1$ represents the capacitance value of the first capacitor, $H_1$ (s) represents the complex frequency domain form of the transfer function of the frequency band extractor, and s represents the complex frequency.

6. The seismic acquisition system based on a frequency domain expansion MEMS sensor according to claim 1, wherein the MEMS sensor is further used for acquiring displacement changes caused by external acceleration and speed, outputting a second MEMS displacement signal, and performing vibration measurement tasks, displacement measurement tasks or aero-engine monitoring tasks.

7. A seismic acquisition system, comprising:

a Micro-Electro-Mechanical System (MEMS) sensor used for receiving a seismic wave signal and well logging information and outputting a first MEMS displacement signal;

a readout circuit used for reading the first MEMS displacement signal and outputting an electrical signal representing the first MEMS displacement signal;

a frequency domain expander;

an analog-to-digital converter (ADC);

a digital signal control unit; and a feedback circuit, wherein the ADC is used for converting the electrical signal into a digital readout signal and transmitting the digital readout signal to the digital signal control unit, the digital signal control unit is used for generating a control signal to control a working mode of the frequency domain expander according to the digital readout signal, and outputting a control signal carrying a frequency expansion control instruction when detecting that the seismic wave signal and the well logging information are greater a frequency band of the MEMS sensor, the frequency domain expander is used for performing waveform compensation on the electrical signal according to the control signal, and outputting a non-frequency expansion signal or a frequency expansion signal, and the feedback circuit is used for generating a feedback signal to the MEMS sensor according to the non-frequency expansion signal or the frequency expansion signal to form a closed loop, wherein the frequency domain expander comprises: an input end and an output end; a first capacitor; a second capacitor; an operational amplifier; a first resistor; a second resistor; a first switch; a second switch; and a third switch, the input end of the frequency domain expander is connected to a first end of the first capacitor, a second end of the first capacitor is connected to a first end of the first resistor, a second end of the first resistor is connected to an inverting input end of the operational amplifier, a non-inverting input end of the operational amplifier is grounded, and an output end of the operational amplifier is the output end of the frequency domain expander, a first end of the second resistor is connected to the inverting input end of the operational amplifier, and a second end of the second resistor is connected to the output end of the operational amplifier, the first switch is connected between the first end and the second end of the first capacitor, the second switch and the second capacitor are connected in series between the inverting input end of the operational amplifier and the output end of the operational amplifier, and the third switch is connected between the input end and the output end of the frequency domain expander, wherein the frequency domain expander is further used as a frequency band extractor to extract a signal of a preset frequency band, the digital signal control unit outputs a control signal carrying a frequency band extraction instruction to make the first, second, and third switches of the frequency domain expander be all switched off, so that the frequency domain expander is used as the frequency band extractor, a transfer function of the frequency band extractor is as follows:

$$H_1(s) = -\frac{R_2 \times C_1 \times s}{R_1 \times C_1 \times s + 1}$$

where $R_1$ represents the resistance value of the first resistor, $R_2$ represents the resistance value of the second resistor, $C_1$ represents the capacitance value of the first capacitor, $H_1(s)$ represents a complex frequency domain form of the transfer function of the frequency band extractor, and s represents the complex frequency.

8. The seismic acquisition system according to claim 7, wherein the resistance value of the first resistor, the resistance value of the second resistor, and the capacitance value of the first capacitor are set according to a resonance frequency of the MEMS sensor.

9. The seismic acquisition system according to claim 7, wherein the frequency expansion control instruction makes the first and third switches be switched off and the second switch be switched on, and when the non-frequency expansion signal needs to be output, the third switch is controlled to be switched on, when the frequency domain expander receives the control signal carrying the frequency expansion control instruction, a transfer function of the frequency domain expander is as follows:

$$H_2(s) = -\frac{C_1 \times R_2 \times s}{(R_1 \times C_1 \times s + 1)(R_2 \times C_2 \times s + 1)}$$

where $R_1$ represents the resistance value of the first resistor, $R_2$ represents the resistance value of the second resistor, $C_1$ represents the capacitance value of the first capacitor, $C_2$ represents the capacitance value of the second capacitor, and $H_2(s)$ is the complex frequency domain form of the transfer function of the frequency domain expander, and s represents the complex frequency.

10. The seismic acquisition system according to claim 7, wherein the digital signal control unit is further used for controlling a working time sequence, sampling or not, a sampling rate, and a reference voltage of the analog-to-digital converter.

11. The seismic acquisition system according to claim 7, wherein the MEMS sensor is further used for acquiring displacement changes caused by external acceleration and speed, outputting a second MEMS displacement signal, and performing vibration measurement tasks, displacement measurement tasks or aero-engine monitoring tasks.

12. A seismic acquisition system, comprising:
a Micro-Electro-Mechanical System (MEMS) sensor used for receiving a seismic wave signal and well logging information and outputting a first MEMS displacement signal;
a readout circuit used for reading the first MEMS displacement signal and outputting an electrical signal representing the first MEMS displacement signal;
a frequency domain expander;
an analog-to-digital converter (ADC);
a digital signal control unit; and
a feedback circuit,
wherein the ADC is used for converting the electrical signal into a digital readout signal and transmitting the digital readout signal to the digital signal control unit,
the digital signal control unit is used for generating a control signal according to the digital readout signal, and outputting the control signal to the frequency domain expander,
the frequency domain expander is used for performing waveform compensation on the electrical signal according to the control signal, and outputting a non-frequency expansion signal or a frequency expansion signal, and
the feedback circuit is used for generating a feedback signal to the MEMS sensor according to the non-frequency expansion signal or the frequency expansion signal to form a closed loop,
wherein the frequency domain expander comprises: an input end and an output end; a first capacitor; a second capacitor; an operational amplifier; a first resistor; a second resistor; a first switch; a second switch; and a third switch,
the input end of the frequency domain expander connected to a first end of the first capacitor, a second end of the first capacitor is connected to a first end of the first resistor, a second end of the first resistor is connected to an inverting input end of the operational amplifier, a non-inverting input end of the operational amplifier is grounded, and an output end of the operational amplifier is the output end of the frequency domain expander,
a first end of the second resistor is connected to the inverting input end of the operational amplifier, and a second end of the second resistor is connected to the output end of the operational amplifier,
the first switch is connected between the first end and the second end of the first capacitor, the second switch and the second capacitor are connected in series between the inverting input end of the operational amplifier and the output end of the operational amplifier, and the third switch is connected between the input end and the output end of the frequency domain expander,
wherein the control signal generated by the digital signal control unit carries a frequency expansion control instruction when detecting that the seismic wave signal and the well logging information are greater a frequency band of the MEMS sensor, and the control signal generated by the digital signal control unit carries a frequency band extraction instruction when the frequency domain expander is used as a frequency band extractor to extract a signal of a preset frequency band,
wherein, in response to the frequency expansion control instruction, the first and third switches are switched off and the second switch is switched on, and in response to the frequency band extraction instruction, the first, second, and third switches are all switched off.

13. The seismic acquisition system according to claim 12, wherein, when the first and third switches are switched off and the second switch is switched on, a transfer function of the frequency domain expander is as follows:

$$H_2(s) = -\frac{C_1 \times R_2 \times s}{(R_1 \times C_1 \times s + 1)(R_2 \times C_2 \times s + 1)}$$

where $R_1$ represents a resistance value of the first resistor, $R_2$ represents a resistance value of the second resistor, $C_1$ represents a capacitance value of the first capacitor, $C_2$ represents a capacitance value of the second capacitor, and $H_2(s)$ is a complex frequency domain form of the transfer function of the frequency domain expander, and s represents the complex frequency.

14. The seismic acquisition system according to claim 12, wherein, when the first, second, and third switches are all switched off, a transfer function of the frequency band extractor is as follows:

$$H_1(s) = -\frac{R_2 \times C_1 \times s}{R_1 \times C_1 \times s + 1}$$

where $R_1$ represents a resistance value of the first resistor, $R_2$ represents a resistance value of the second resistor, $C_1$ represents a capacitance value of the first capacitor, $H_1(s)$ represents a complex frequency domain form of the transfer function of the frequency band extractor, and s represents the complex frequency.

15. The seismic acquisition system according to claim 12, wherein the MEMS sensor is further used for acquiring displacement changes caused by external acceleration and speed, outputting a second MEMS displacement signal, and performing vibration measurement tasks, displacement measurement tasks or aero-engine monitoring tasks.

* * * * *